Sept. 2, 1924.
O. W. BEEHLER ET AL
1,507,041
TRAFFIC SIGNAL
Filed March 9, 1921    2 Sheets-Sheet 2
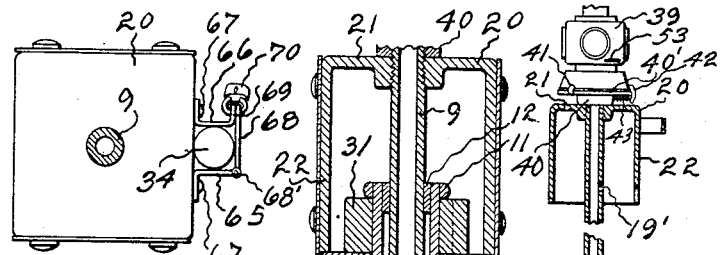
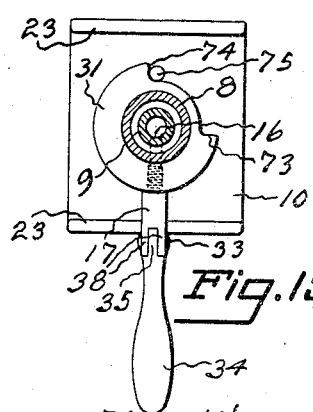
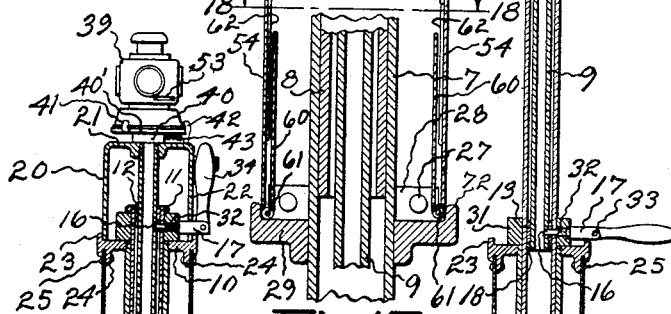
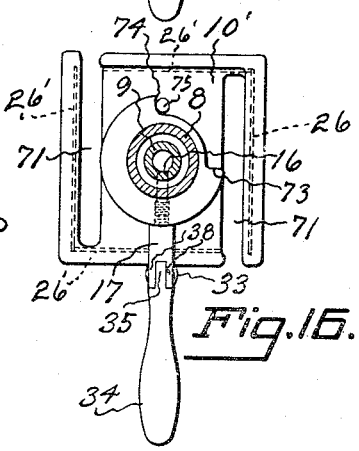
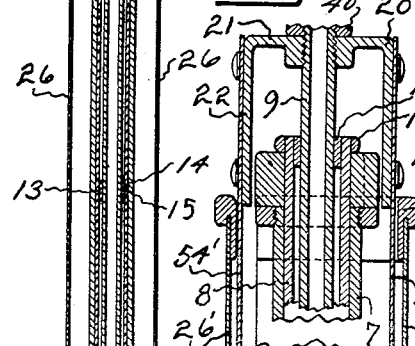
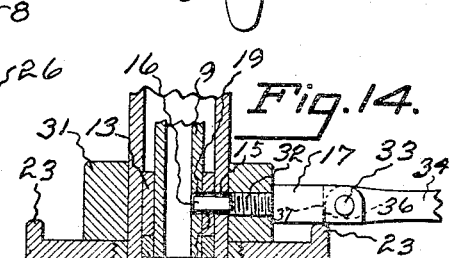
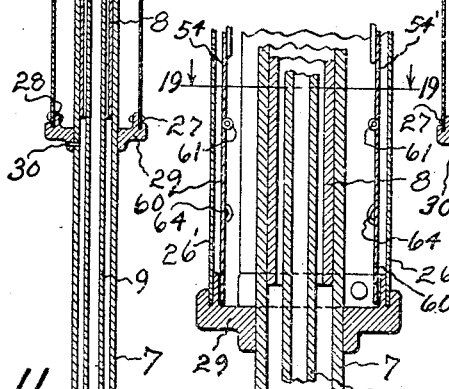
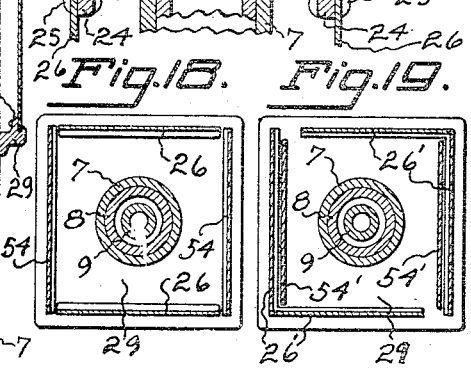
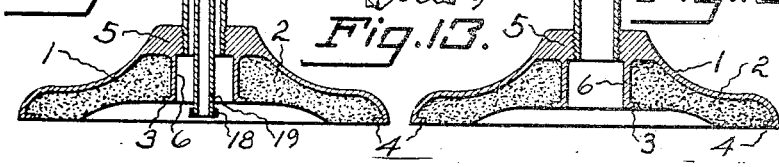
INVENTORS
ORRIN W. BEEHLER
& LLOYD B. COGSWELL
BY
Louis A. Bisson,
ATTORNEY Patented Sept. 2, 1924.

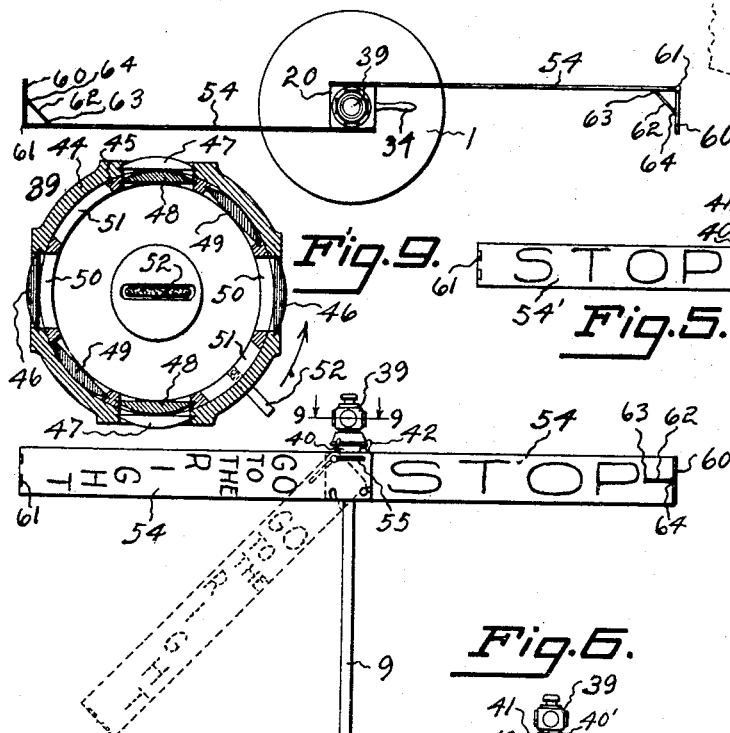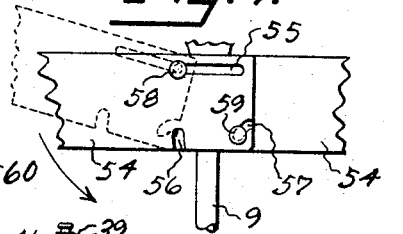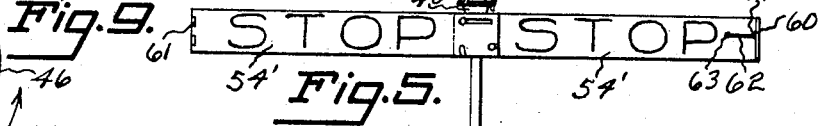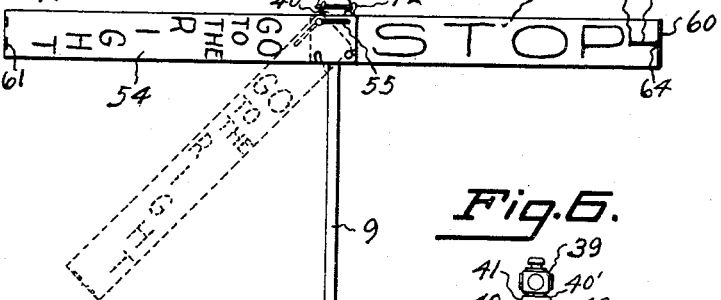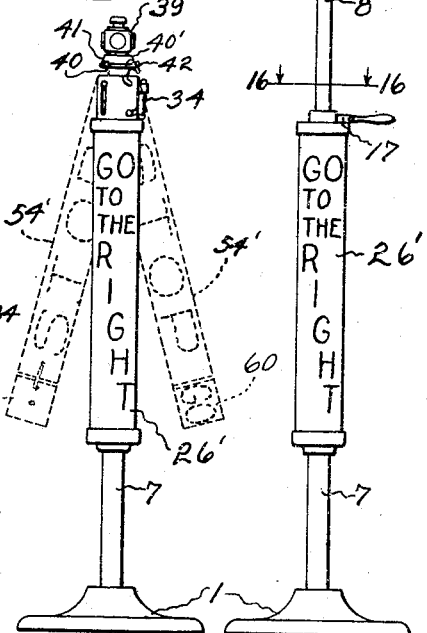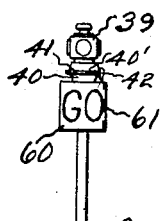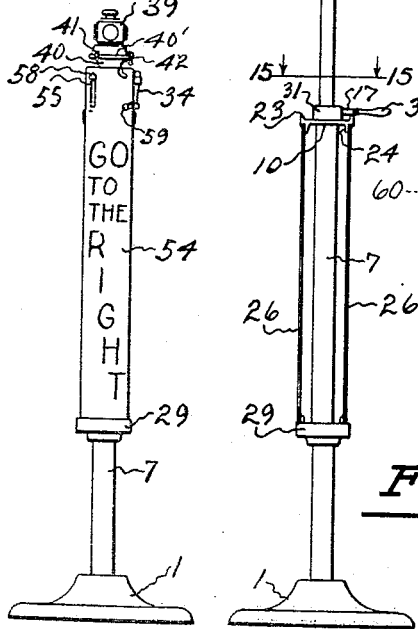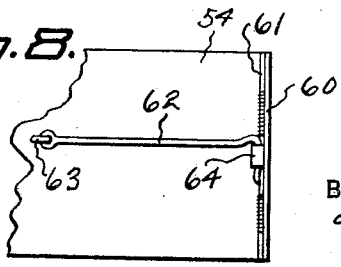

1,507,041

UNITED STATES PATENT OFFICE.

ORRIN W. BEEHLER, OF THOMPSONVILLE, CONNECTICUT, AND LLOYD B. COGSWELL, OF SPRINGFIELD, MASSACHUSETTS; SAID COGSWELL ASSIGNOR TO SAID BEEHLER.

TRAFFIC SIGNAL.

Application filed March 9, 1921. Serial No. 450,911.

*To all whom it may concern:*

Be it known that ORRIN W. BEEHLER and LLOYD B. COGSWELL, citizens of the United States, residing at and whose post-office addresses are, respectively, Enfield Street, Thompsonville, Hartford County, State of Connecticut, and 85 Hall Street, Springfield, county of Hampden, State of Massachusetts, have invented certain new and useful Improvements in Traffic Signals; and we do hereby declare the following to be a full, clear, and exact description of the invention, such as will enable others skilled in the art to which it appertains to make and use the same.

The present invention relates to traffic signals of the type placed at the intersection of streets and similar thoroughfares along which traffic, more especially vehicular traffic, may be safely directed and guided during either the day time or the night time or both.

Among the objects of the invention is to construct a traffic signal capable of use as either an "active" or "passive" traffic signal for the purpose of directing and guiding traffic at all times, so that when an officer is "on duty" it may be put into condition for operation and be operated as an "active" signal and when the officer is "off duty" for use as a "passive" guide.

Another object of the invention, is to so construct the device that it may be readily raised or hoisted into position for use as an "active" signal or guide and readily lowered into position for use as a "passive" guide or "silent cop" without necessitating the use of independent devices for the purposes mentioned.

Another object of the invention is to construct the device with visible signal panels or direction indicating plates capable in one position, such as the "active" position, to direct movement of traffic and in another position, such as the "passive" position, to indicate direction of traffic movement.

A still further object of the invention is to construct the device with a signal capable of acting as a visible guide, as colored lights, during darkness both in the "active" or "passive" position, without the necessity of the use of independent means for the different purposes mentioned.

Other objects and advantages of the invention will more fully appear from the following specification and as illustrated upon the accompanying drawing, upon which:

Fig. 1 is a view in elevation of one form of device constructed in accordance with the invention and shown in "active" position; Fig. 2 is a similar view taken at right angles to that shown in Fig. 1; Fig. 3 is a top plan view of the device when in "active" position; Fig. 4 is a view in elevation of the device when collapsed or closed into the "passive" position for "silent cop" duty; Fig. 5 is a view similar to Fig. 1 showing a slightly modified form; Fig. 6 is a view in elevation showing the method of closing or nesting the signal panels within the device when forming a "silent cop" of the device; Fig. 7 is a fragmentary detail side view of the mode of mounting the signal panels; Fig. 8 is a fragmentary detail view of the "Stop" and "Go" sign construction; Fig. 9 is a view in horizontal section taken on line 9—9 of Fig. 1, of a novel form of lantern or light signal adapted for use with the device in either the "passive" or "active" positions; Fig. 10 is a vertical sectional view of the device when in the raised or "active" position; Fig. 11 is a similar view when in the lowered or "passive" or "silent cop" position; Fig. 12 is a similar fragmentary view on an enlarged scale showing more particularly the details of the form of signal shown more generally in Figs. 1 and 2; Fig. 13 is a similar view of the signal shown more generally in Figs. 5 and 6; Fig. 14 is a fragmentary sectional view on an enlarged scale showing details of the means for locking the relatively movable parts of the standard in either the raised or lowered position; Fig. 15 is an enlarged sectional view taken on line 15—15 of Fig. 1; Fig. 16 is a similar view taken on line 16—16 of Fig. 5; Fig. 17 is a similar view taken on a plane of the top surface of the head piece; and Figs. 18 and 19 are sectional views taken on lines 18—18 and 19—19 of Figs. 12 and 13, respectively.

Referring more particularly to the drawing the device comprises a pedestal 1 of suitable metal, such as cast iron or steel, of sufficient size and weight to give the device stability. The pedestal is preferably formed hollow to receive a filling 2 of material, such as concrete, cement or the like, suitable lugs 3 and 4 being formed integral with the pedestal casing for the purpose of holding the filling 2 in position or from working loose or falling out. The bottom of the pedestal is preferably concave in order that it may more firmly rest upon uneven surfaces without danger of the device rocking. The central portion 5 of the pedestal may comprise a depending sleeve portion 6 through which extends the lower end of a standard element, as will hereinafter more fully appear. The standard, in the forms shown, comprises a series of telescopic members 7, 8, and 9 of tubular form of which the outer tube 7 is secured at its lower end by screw threads to the central portion 5 of the pedestal, and at its upper end, also by screw threads to a bearing plate 10. The intermediate tube 8 is of shorter length than the tube 7 and is freely slidable therein with the upper end of the tube 8 provided externally thereof with a supporting collar 11 and internally thereof with a guide ring 12, both of which may be suitably fastened in permanent relation to the tube 8, as by sweating, welding, brazing or any other convenient manner desired. At an intermediate portion of the tube 8 and within the same is similarly secured a guiding and lock ring 13, the latter also acting as an abutment ring for the inner tube 9 when being raised in upper position, as will more clearly appear hereinafter. Both this ring and the tube 8 have registering apertures 14 and 15 adapted to receive a lock pin 16 of a locking bolt 17, more fully described hereinafter. The inner tube 9 is freely slidable within the tube 8 and is guided by the rings 12 and 13. At the lower end of the tube is permanently fastened, in a manner similar to rings 12 and 13, an abutment ring 18 adapted during the upward movement of the tube 9 to abut with the ring 13 and to carry it and the tube 8 upwardly therewith after such abutting action. The lower end of the tube 9 is also provided with an aperture 19 adapted to register with apertures 14 and 15 when in upper position and to receive the pin 16 of the locking bolt 17, as will more fully appear hereinafter. To the upper end of the tube 9 may be secured in any suitable manner, as by screw threads, a head piece 20 having a platform 21 and side walls 22. The lower ends of the side walls 22 are adapted to rest upon the upper surface of the bearing plate 10 just within the upstanding flanges 23 of the plate 10. The latter also has a pair of depending flanges 24 to which may be secured as by rivets 25, a pair of side plates or panels 26, the lower ends of which are secured, as by rivets 27 to a pair of upstanding flanges 28 forming part of base plate 29 non-rotatably fastened to the outer tube 7 of the standard by means of a pin 30, as is clearly shown in Figs. 10 and 11. The side panels 26 may have printed, painted, stenciled or otherwise marked thereon, the words, "Go to the right," as is clearly shown in the several figures of the drawing.

Upon the bearing plate 10 rests a shift ring 31 which is centrally apertured for permitting the vertical sliding therethrough of the tube 8. The ring 31 also has a lateral aperture which is suitably threaded to receive the threaded shank 32 of the locking bolt 17, the latter having pivotally connected thereto, as by pivot pin 33, at its outer end, a handle 34. The latter has a tongue 35 provided with a squared abutting portion 36 adapted to seat against the face 37 of the bolt 17 between the ears 38, so that the handle 34 cannot fall below the horizontal position, as is clearly shown in Fig. 14. The tongue 35, however, is otherwise rounded to permit the upward swing of the handle 34 in the position shown in Figs. 4, 6, 11 and 17. The other end of the bolt 17 is reduced in diameter to form a pin portion 16 adapted to project through the apertures 14, 15 and 19 provided in ring 13 and tubes 8 and 9, respectively, when in raised position, as shown in Figs. 1, 2, 5, 10 and 14, or through the upper apertures 15' and 19' of the tubes 8 and 9, respectively, when in lowered position as is shown in Figs. 4, 6 and 11. The projection or withdrawal of the end of the pin portion 16 from the apertures 14 and 19, for the purpose of holding the tubes 8 and 9 in upper locked position or for releasing the same for lowering, is attained by a simple rotation of the handle 34 and bolt 17 whereby the threaded shank 32 moves linearly inwardly or outwardly depending upon the direction of rotation thereof.

A lantern 39 is supported at the upper end of the standard upon a support 40, suitably secured, as by screw threads, to the upper end of the inner tube 9, as is clearly shown in Figs. 1, 2, 10 and 11. This support has a platform 40' carrying at its periphery, a pair of fingers 41 rigid or formed integral therewith and also carrying a movable finger 42 having a shank adapted to slide in a guide-way formed underneath the platform 40', such finger being normally held in inner position by a suitable spring 43. The finger 42 has a depending finger grip portion by which it may be grasped to move the finger 42 from the platform 40' for removal of the lantern 39, the spring 43 otherwise holding the finger 42 in engagement with the lantern base for holding the lantern in place.

The lantern 39 may be of any desired form such as will be adapted for use with the invention herein described, and shown in the drawings. One form of lantern adapted for use with our invention is shown in section in Fig. 9. It comprises a pair of concentric shells 44 and 45 of which the former is the outer shell and the latter is the inner shell. The inner shell is angularly movable within the outer shell for a purpose more fully appearing hereinafter. The outer casing or shell is provided with four windows, in two diametrically opposed ones of which are located red glasses or lenses 46 and in the other two are located clear glasses or lenses 47. The inner shell has eight windows in two diametrically opposed ones of which are located green glasses or lenses 48, and in two others at 45° from the green lenses are located red glasses or lenses 49. Of the others, the windows 50 and 51 have no glasses or lenses. Within the lantern is located a wick 52 which, when lighted in the usual manner, emits light rays to the various windows. With the shells 44 and 45 in the relation shown in Fig. 9, the light rays directed to the left and to the right, pass through windows 50 and red lenses 46, and the light rays directed forwardly and rearwardly pass through the green and clear glasses or lenses 48 and 47. This relation of lights is used at night when the traffic signal is in the raised or "active" position so that when the officer on duty operates the sign for the purpose of stopping traffic in one direction, the turning of standard, by means of the handle 34, will simultaneously turn the lantern so that the red lights 46 will be presented against the traffic while the green lights 48 will be at right angles thereto so as to signal a movement of traffic along a transverse thoroughfare. A reverse operation of the handle 34 will produce a reverse effect, as will be clearly apparent from the above. When, however, the traffic signal is collapsed or lowered to "inactive" or "passive" position when the officer goes off duty and the signal is to operate as a "silent cop" the shell 45 may be angularly moved to bring the red glasses or lenses 49 into juxtaposition with the clear glasses 47, the green lights 48 taking the positions of the windows 51 and the latter taking the positions of the windows 50 in juxtaposition with the red lights 46, so that red light rays are emitted on all sides of the signal for night or "silent cop" duty. Inasmuch as the red lights are in lowered position there is no danger of confusing the moving traffic taking such signal for a "stop" signal. It is only when the lantern is in raised position and the red lights show in a given direction, that the "stop" signal is indicated. For the purpose of angularly moving the inner shell 45 the same has secured to it a pin 52 which projects outwardly through an elongated slot 53 formed in the outer shell 44 to a sufficient extent for convenient manual movement thereof in the direction of the arrow shown in Fig. 9 for producing a "silent cop" lantern or in an opposite direction for "active" operation.

For daylight signaling, the standard carries a pair of plates or panels 54 connected to opposite sides of the head piece 20 and extending in opposite directions. Upon these panels appear the words "Stop" in one side thereof and the words "Go to the right" upon the opposite side thereof, as is clearly shown in Fig. 1 or if desired, both panels have the word "Stop" on both faces of each as is clearly shown in Fig. 5. The inner end of each panel is detachably connected to the head piece 20 by pin and slot means. Each panel has an elongated slot 55 and short curved slots or notches 56 and 57 adapted to pass over or cooperate with headed pins 58 and 59 made fast with the head piece 20, the slot 55 being slidable over the pin 58 and the slots 56 and 57, alternately or selectively cooperating with the pin 59 depending upon whether the panel is in raised and horizontal position or in the lowered and vertical position. The space between the heads of the pins 58 and 59 is slightly greater than the thickness of the plate 54 in order that the latter may have free movement in such space when being raised or lowered. It will be noted that when the panels are in the latter position, as shown in Figs. 4 and 6, the pin 58 is at the upper end of the slot 55 and the pin 59 is in engagement within the slot or notch 56. When it is desired to raise the panels into the position shown in Figs. 1 and 5, the panel is first slightly raised and laterally swung to cause the slot 55 to ride along pin 58 and the slot or notch 56 to disengage from the pin 59. The panel is then raised into the dotted line position shown in Fig. 7 and is then moved lengthwise to cause the slot 55 to ride along pin 58 and to finally cause the slot or notch 57 to engage over pin 59 at which instant the panel or plate is in the full line position shown in Figs. 7, 1 and 5. The plates or panels are thus locked into position and cannot be disconnected without the intervention of a manual manipulation as above indicated. Thus, when it is desired to lower the panels, the same is first tilted upwardly slightly, as well as drawn lengthwise, so as to disengage the notch 57 from the pin 59 and then moved lengthwise to the position shown in dotted lines in Fig. 7. The panel is then lowered about the pin 58 as a pivot until the notch 56 engages with the pin 59, the plate or panel being then locked in vertical position and ready for a lowering of the standard.

At the outer ends of the panels 54 are connected additional plates or panels 60 upon one side of each of which appears the word "Go." This plate 60 is suitably hinged by means of a hinge 61 or similar pivotal means, so that the plate 60 may lie in parallel relation to the plate or panel 54, as is clearly shown in Fig. 12, or as an extension thereof, as is shown in Fig. 13, and in a position at right angles to the panel 54, as shown in Figs. 1, 2, 5 and 8, such being the active position. A suitable spring of any desired form may be used, in connection with the hinge 61, tending to hold the plate 60 in either of the relations, with respect to the panel 54, shown in Figs. 12 and 13. When in the signaling position, the plate 60 is held at right angles to the panel 54 by means of a hook 62 which may be conveniently pivotally connected, as by an eyelet 63 fast with the panel 54 and detachably engaged with an eyelet 64 fast with the inner side of the plate 60. This hook is attached to or detached from the eyelet 64 manually after the panels are raised into horizontal position or before they are lowered into vertical position. The traffic signal is designed so that it may be used between car tracks that are located close to each other and the "Go" plates 60 are made of comparatively small size so that as the signal is turned for the "Go" signal, the panels will then be parallel to the car tracks and the "Go" signal will not be interfered with by the passage of cars in opposite directions on both tracks on both sides of the signal. Heretofore, traffic signals for use between car tracks had to be built with high signal arms or panels so that the car roofs could pass beneath them. In our invention, this is avoided and a signal of the "lower-arm" or panel type may be used between passing cars in a comparatively narrow space. Such position of the signal is shown in Fig. 2.

In order to prevent tampering with the signal when the officer goes off duty, the device may be locked. This is attained by securing hasp straps 65 and 66 by means of bolts or rivets 67 to the head piece 20, as shown in Fig. 17. A hasp 68 is connected by a hinge 68' to the free end of the strap 65 and has an aperture at its other end adapted to register with an aperture provided in the end 69 of the strap 66, a locking ring, a pad-lock 70 suitably passing through these apertures when locking the hasp parts together. The handle 34 is adapted, when turned in an upright position, as shown in Figs. 4, 6, 11 and 17, to occupy the space formed between the hasp 68 and the head piece 20 and between the strap 65 and 66 whereby the handle may be held in locked position. If desired, the hasp 68 may carry a piece adapted, when in locked position, to interfere with the pin 52 of the lantern, in order that the inner shell cannot be turned back from the relation set by the officer when the traffic signal is left.

It will be noted that the plates or panels 26, bearing the words "Go to the right," form a permanent part of the standard, being secured on opposite sides of the tube 7. In the form of the device shown in Figs. 1, 16 and 18, the panels 54 complete the other sides of the "Go to the right," "silent-cop" post or casing, when the panels are in lowered position, as shown in Figs. 4 and 18. In such case the words "Stop" are on the inside and hidden from view. In some cases it may be desirable to form the four sides of the "silent-cop" casing with permanent plates 26', bearing the words "Go to the right" on all sides. In such cases the two sides of the panels 54 may bear the words "Stop," as shown in Figs. 5, 6, 16 and 19. In this form, the bearing plate 10' corresponding to plate 10 of the device shown in Fig. 1 (see Fig. 16) may have slots 71 in which the panels 54' may be received behind the plates 26' (see Fig. 19). The plates 54' may be caused to move vertically downwardly in the slots 71 when the standard is being lowered as a whole or the standard may be first lowered with the arms or panels 54' in horizontal position and then the latter disconnected and angularly moved or "sliced" into the slots 71 at the rear of the plates or panels 26', as shown in Figs. 6 and 19. (See also Figs. 12 and 13.) The slots 71 may be closed slots instead of being open at one end, as shown in Fig. 16, and in such case, the panels 54' must be first lowered and then introduced vertically through such slots as the standard is lowered. (See Fig. 13.)

In the type of device shown in Figs. 1 and 2, when the standard is lowered the "Go" plate 60 will be folded parallel to the plate or panel 54 and the lower end of the latter placed within the upstanding flange 72 of the base plate 29, as is clearly shown in Fig. 12. Such relation of the plates 60 and 54 may be used, however, in the form of device having the slots 70 where the plates 54' are nested within the casing of plates 27 and 27', the position of the plate 60 in parallel relation to the plate 54' being maintained by the spring of the hinge 61. In the type of device shown in Figs. 5, 6, 16, 18 and 13, the "Go" plate 60 may depend from the end of the plate 54', as is clearly shown in Fig. 13, whether or not the plates 60 and 54' be moved vertically or angularly into place behind the plates 26.

Assuming the device to be in collapsed condition, as shown in Fig. 4, in operation, the handle 34 is unlocked, and lowered into horizontal position. The standard is then raised causing the tubes 8 and 9 to telescopically slide upwardly so that the collar or ring 18 will contact with ring 13 and thus "pick-up" the tube 8. When the tubes reach upper position, the handle 34 is rotated to cause the locking pin 16 to pass into the apertures 14, 15 and 19 for locking the tubes in raised position. The panels 54 or 54' are then raised into position and properly attached with relation to the pins 58 and 59. The "Go" plates are then turned at right angles to the plates 54 or 54' and the hooks 62 secured thereto. The traffic signal is now ready for "active" operation. This operation is effected by a simple 90° angular horizontal movement of the handle 34. (See Fig. 15.) It will be noted that the limit stop or shift ring 31 has an arc-shaped portion removed from it to form abutting shoulders 73 and 74 adapted at their limits of angular movements to abut against a stop pin 75 fixed into the top of the bearing plate 10. When the handle is angularly moved, this ring 31 is carried with it until either shoulder 73 or 74 abuts the pin 75, the panels 54 or 54' and 60 being then in proper relation or position with respect to the thoroughfares to be controlled. If the lantern is to be used, as for night signaling, the pin 52 may be operated to move the inner shell 45 to present the proper lens 48 at the rear of the clear lens 47.

When the signal is to be lowered into the "silent-cop" condition, the standard may be first lowered, by rotating the handle 34, to unlock the pin 16 from the tubes 8 and 9, the latter then lowered, the "Go" plates unhooked, the plates 54 or 54' then detached and lowered and the handle turned up and locked by the pad-lock. If desirable, the "Go" plates 60 may be first unhooked and the plates 54 or 54' then lowered, before lowering the tubes 8 and 9. The lantern may also be adjusted by moving the pin 52 to present the lenses 49 at the rear of the lenses 47.

While we have herein described and illustrated upon the drawing several forms, details and arrangements of parts, it is to be understood that the invention is not limited to the particular forms, details and arrangements of parts shown and described, but that it comprehends other forms, details and arrangement of parts as do not depart from the spirit of the invention and the scope of the appended claims.

Having thus described our invention what we claim and desire to secure by United States Letters Patent is:

1. In a traffic signal, the combination of an extensible support, and movable and relatively stationary signal members on said support, said movable members forming an active signal in the extended position of said support and cooperative with said stationary members for forming a passive signal in the collapsed position of said support.

2. In a traffic signal, the combination of an extensible support, movable and relatively stationary signal members on said support, said movable members forming an active signal in the extended position of said support and cooperative with said stationary members for forming a passive signal in the collapsed position of said support, and means for holding said support in extended position.

3. In a traffic signal, the combination of an extensible support, movable and relatively stationary signal members on said support, said movable members forming an active signal in the extended position of said support and cooperative with said stationary members for forming a passive signal in the collapsed position of said support, and means for moving said movable members into different signaling positions when said support is in the extended position.

4. In a traffic signal, the combination of an extensible support, movable and relatively stationary signal members on said support, said movable members forming an active signal in the extended position of said support and cooperative with said stationary members for forming a passive signal in the collapsed position of said support, and means for holding said support in extended position, and means for moving said movable members into different signaling positions when said support is in the extended position.

5. In a traffic signal, the combination of an extensible support comprising a base member and a top member, and shiftable signal members connected to said top member for forming an active signal in the extended position of said support and a passive signal in the collapsed position of said support.

6. In a traffic signal, the combination of an extensible support comprising a base member and a top member, shiftable signal members connected to said top member for forming an active signal in the extended position of said support and a passive signal in the collapsed position of said support, and means for holding said support in extended position.

7. In a traffic signal, the combination of an extensible support comprising a base member and a top member, shiftable signal members connected to said top member for forming an active signal in the extended position of said support and a passive signal in the collapsed position of said support, and means for moving said signal members into different signaling positions when said support is in extended position.

8. In a traffic signal, the combination of an extensible support comprising a base member and a top member, shiftable signal members connected to said top member for forming an active signal in the extended position of said support and a passive signal in the collapsed position of said support, and means for holding said support in extended position, and means for moving said signal members into different signaling positions when said support is in extended position.

9. In a traffic signal, the combination of an extensible support comprising a base member and a top member movable relative to said base member, shiftable signal members on said top member, means for holding said signal members in either horizontal or vertical position, and relatively stationary signal members on said base member, said shiftable signal members forming an active signal when in horizontal position and when said support is in extended position and said movable members being cooperative with said stationary signal members for forming a passive signal when in vertical position and when said support is in collapsed position.

10. In a traffic signal, the combination of an extensible support comprising a base member and a top member movable relative to said base member, shiftable signal members on said top member, means for holding said signal members in either horizontal or vertical position, relatively stationary signal members on said base member, said shiftable signal members for forming an active signal when in horizontal position and when said support is in extended position and said movable members being cooperative with said stationary signal members for forming a passive signal when in vertical position and when said support is in collapsed position, and means for locking said support in extended position.

11. In a traffic signal, the combination of an extensible support comprising a base member and a top member movable relative to said base member, shiftable signal members on said top member, means for holding said signal members in either horizontal or vertical position, relatively stationary signal members on said base member, said shiftable signal members forming an active signal when in horizontal position and when said support is in extended position and said movable members being cooperative with said stationary signal members for forming a passive signal when in vertical position and when said support is in collapsed position, and means for moving said active signal in different signaling positions.

12. In a traffic signal, the combination of an extensible support comprising a base member and a top member movable relative to said base member, shiftable signal members on said top member, means for holding said signal members in either horizontal or vertical position, relatively stationary signal members on said base member, said shiftable signal members forming an active signal when in horizontal position and when said support is in extended position and said movable members being cooperative with said stationary signal members for forming a passive signal when in vertical position and when said support is in collapsed position, and means for locking said support in extended position, and means for moving said active signal in different signaling positions.

13. In a traffic signal, the combination of an extensible support comprising a base member and telescopic movable members, signal members carried by said movable members for forming an active signal when said movable members are in raised position, and for forming a passive signal when said members are in lowered position.

14. In a traffic signal, the combination of an extensible support comprising a base member and telescopic movable members, signal members carried by said movable members for forming an active signal when said movable members are in raised position, and for forming a passive signal when said members are in lowered position, a locking member cooperative with said movable members for locking the same in raised and lowered positions, and manually operated means connected to said locking member for moving said signal members into different signaling positions when in raised position.

15. In a traffic signal having a movable support, the combination of signal panels connected to and movable with said support, and signal panels connected to the ends of and movable with said first mentioned signal panels and disposed at a normal thereto.

16. In a traffic signal having a movable support, the combination of relatively long signal panels connected to said support and movable therewith, relatively short signal panels pivotally connected to the outer ends of said first mentioned signal panels, and means for maintaining said short panels at right angles to said long panels.

17. In a traffic signal, the combination of an extensible and angularly movable support, main signal panels on said support, means for holding said panels in horizontal or vertical position, auxiliary panels hinged to the outer ends of said main panels and adapted to extend in transverse position with respect to said main panels, and means for holding said auxiliary panels in said position.

18. In a traffic signal, the combination of an extensible support having a pedestal, an upright member secured to said pedestal, and telescopic members extending into said upright member, a panel frame secured to said upright member, passive signal panels on said frame, a head at the upper end of said telescopic members, active signal panels on said head, pin and slot connections for the last mentioned panels whereby the same may be moved to and from and held in either horizontal or vertical position, said frame adapted to receive said active panels when moved to vertical position and when said support is lowered, a light signal on said support cooperative with said signal panels in raised or lowered position, means for locking said support in raised or lowered position, and means for manually moving said telescopic member and active signal panels into different signaling positions.

19. In a traffic signal having an extensible support and active and passive signal members, the combination of a signal lantern cooperative with said members and comprising a casing having a plurality of windows, colored panels in said windows with the diametrically opposed windows of the same color, a movable shell having open and colored windows being located in said casing and adapted when moved to juxtapose open or colored windows opposite the windows of said casing for producing active or passive signals, and means for manually moving said shell.

20. In a traffic signal having an upright support, the combination of a head piece on said support, signal panels movably supported by said head piece, said head piece and said panels having cooperable means for locking the panels in signaling position, and means for moving said panels into different signalling position.

21. In a traffic signal having an upright support, the combination of a head piece mounted on said support, said head piece having side walls, signal panels movably connected to said side walls, said head piece and said panels having cooperable means for locking the panels in signaling position, and means for moving said panels into different signalling positions.

22. In a traffic signal having an upright support, the combination of a head piece mounted on said support, signal panels each connected at one end thereof to said head piece and the other end thereof extending outwardly when in active signalling position, means for movably supporting said panels whereby said panels may extend downwardly from said head piece when in inactive position, said head piece and said panels having cooperable means for locking the panels in signaling position, and means for moving said panels into different signalling positions.

23. In a traffic signal having a support, the combination of a head piece, signal panels movably connected to said head piece, means for holding said panels in outwardly extended position with respect to said head piece, said holding means comprising cooperable means on said head and panels serving to lock the panels in signaling position, and means for moving said panels into different signaling positions.

24. In a traffic signal having a support, the combination of a head piece, signal panels movably connected to said head piece, means for holding said panels in outwardly extended position with respect to said head piece, said holding means comprising cooperable pin and slot connections for locking the panels in signaling position, and means for moving said panels into different signaling positions.

In testimony whereof we affix our signatures.

ORRIN W. BEEHLER.
LLOYD B. COGSWELL.